United States Patent
Tseng et al.

(10) Patent No.: US 12,321,513 B2
(45) Date of Patent: Jun. 3, 2025

(54) BODY-PART TRACKING DEVICE AND BODY-PART TRACKING METHOD

(71) Applicant: Advanced Semiconductor Engineering, Inc., Kaohsiung (TW)

(72) Inventors: Chi Sheng Tseng, Kaohsiung (TW); Lu-Ming Lai, Kaohsiung (TW); Hui-Chung Liu, Kaohsiung (TW); I Hung Wu, Kaohsiung (TW); Kai-Sheng Pai, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 338 days.

(21) Appl. No.: 17/352,125

(22) Filed: Jun. 18, 2021

(65) Prior Publication Data

US 2022/0404908 A1 Dec. 22, 2022

(51) Int. Cl.
| G06F 3/01 | (2006.01) |
| G01S 13/75 | (2006.01) |
| G06K 19/077 | (2006.01) |
| H01Q 1/27 | (2006.01) |

(52) U.S. Cl.
CPC .............. G06F 3/013 (2013.01); G01S 13/75 (2013.01); G06K 19/07773 (2013.01); H01Q 1/273 (2013.01)

(58) Field of Classification Search
CPC ........... G06F 3/013; G06F 3/01; G01S 13/75; G06K 19/07773; H01Q 1/273; H01Q 5/371

See application file for complete search history.

(56) References Cited

U.S. PATENT DOCUMENTS

| 5,682,210 A * | 10/1997 | Weirich | H04N 5/7491 |
| | | | 348/E5.145 |
| 8,628,194 B2 | 1/2014 | Sabeta | |
| 8,870,370 B1 * | 10/2014 | Otis | A61B 5/14546 |
| | | | 351/159.03 |
| 2003/0179094 A1 * | 9/2003 | Abreu | A61B 5/14532 |
| | | | 128/920 |
| 2004/0044418 A1 * | 3/2004 | Goldstein | G02C 7/04 |
| | | | 700/1 |
| 2010/0001926 A1 * | 1/2010 | Amirparviz | A61B 5/6821 |
| | | | 250/221 |
| 2014/0198382 A1 * | 7/2014 | Chen | A61B 3/113 |
| | | | 359/464 |
| 2015/0005606 A1 * | 1/2015 | Honore | A61B 5/0026 |
| | | | 600/365 |
| 2015/0061990 A1 * | 3/2015 | Toner | G06F 3/0346 |
| | | | 351/158 |
| 2017/0115511 A1 * | 4/2017 | Beaton | G02C 7/04 |
| 2017/0115742 A1 | 4/2017 | Xing et al. | |

(Continued)

*Primary Examiner* — Lunyi Lao
*Assistant Examiner* — Jarurat Suteerawongsa
(74) *Attorney, Agent, or Firm* — FOLEY & LARDNER LLP

(57) ABSTRACT

The present disclosure provides a body-part tracking device and a body-part tracking method. The body-part tracking device includes a first electronic component and a first antenna element. The first antenna element is electrically connected to the first electronic component and configured to receive a first wave. The first electronic component is configured to, in response to the first wave, transmit a second wave.

19 Claims, 9 Drawing Sheets

(56) References Cited

U.S. PATENT DOCUMENTS

| | | | |
|---|---|---|---|
| 2017/0168322 A1* | 6/2017 | Toner | G02C 11/10 |
| 2018/0149884 A1* | 5/2018 | Miller | G02B 27/01 |
| 2019/0167095 A1* | 6/2019 | Krueger | A61B 3/113 |
| 2021/0036425 A1* | 2/2021 | Jain | G02C 7/04 |

* cited by examiner

BODY-PART TRACKING DEVICE AND BODY-PART TRACKING METHOD

BACKGROUND

1. Technical Field

The present disclosure generally relates to a body-part tracking device and a body-part tracking method of the same.

2. Description of the Related Art

Body-part tracking devices have been widely adopted in augmented reality (AR), virtual reality (VR), and mixed reality (MR) applications. However, conventional body-part tracking devices may present drawbacks, such as, for example, near-infrared (NIR)-enabled body-part tracking devices may be harmful to a wearer, and magnetic body-part tracking devices may provide inadequate response time and accuracy.

SUMMARY

In one or more embodiments, a body-part tracking device includes a first electronic component and a first antenna element. The first antenna element is electrically connected to the first electronic component and configured to receive a first wave. The first electronic component is configured to, in response to the first wave, transmit a second wave.

In one or more embodiments, a body-part tracking device includes a first carrier and a frame. The first carrier is configured to contact a first body part of a wearer when worn. The first carrier includes a first transceiving module. The frame is spaced apart from the first carrier. The frame includes a second transceiving module. The second transceiving module is configured to receive a first wave from the first transceiving module and to determine, based thereon, at least one of: a location of the first body part, a movement of the first body part, or a viewing focus of the first body part.

In one or more embodiments, a body-part tracking method comprises transmitting a first RF wave; transmitting, in response to the first RF wave, a second RF wave; tracking a movement or a position of a carrier configured to contact a wearer's eye when worn based on the first RF wave and the second RF wave; calculating a viewing direction of the wearer's eye based on the movement or the position of the carrier; and providing information including the viewing direction of wearer's eye to an external system.

BRIEF DESCRIPTION OF THE DRAWINGS

Aspects of the present disclosure are readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
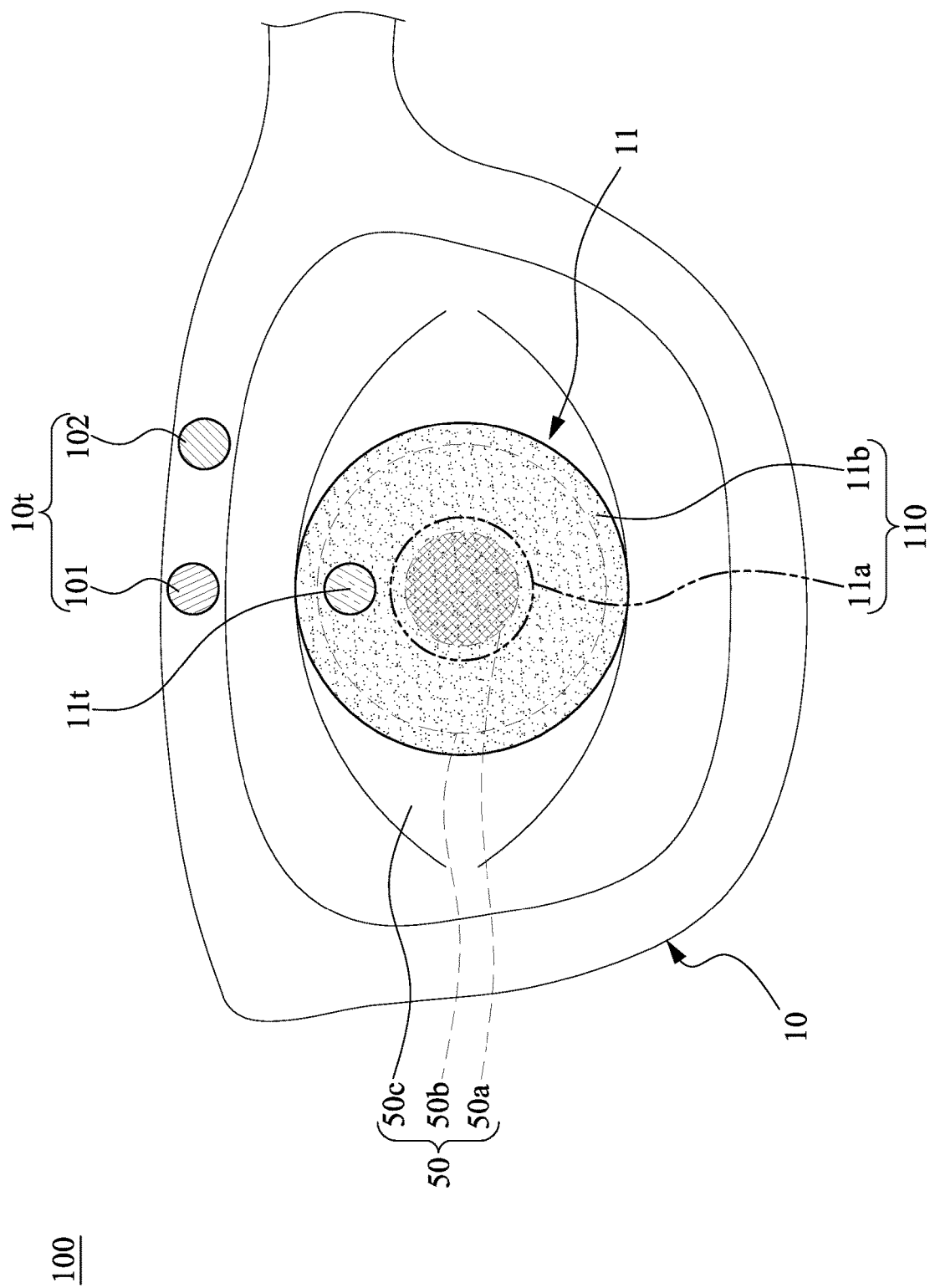
FIG. 1 is a diagram of a body-part tracking device when worn in accordance with some embodiments of the present disclosure.

The following disclosure provides for many different embodiments, or examples, for implementing different features of the provided subject matter. Specific examples of components and arrangements are described below. These are, of course, merely examples and are not intended to be limiting. In the present disclosure, reference to the formation of a first feature over or on a second feature in the description that follows may include embodiments in which the first and second features are formed in direct contact, and may also include embodiments in which additional features may be formed between the first and second features, such that the first and second features may not be in direct contact. Besides, the present disclosure may repeat reference numerals and/or letters in the various examples. This repetition is for simplicity and clarity and does not in itself dictate a relationship between the various embodiments and/or configurations discussed.

Embodiments of the present disclosure are discussed in detail below. It should be appreciated, however, that the present disclosure provides many applicable concepts that can be embodied in a wide variety of specific contexts. The specific embodiments discussed are merely illustrative and do not limit the scope of the disclosure.

FIG. 1 is a diagram of a body-part tracking device 100 when worn in accordance with some embodiments of the present disclosure. The body-part tracking device 100 may include a frame 10 and a carrier 11. The body-part tracking device 100 may include an eye tracking device. The frame 10 may be referred to as a body-part tracking device (e.g., an eye tracking device) and the carrier 11 may be referred to as a body-part tracking device (e.g., an eye tracking device) in the present disclosure.

The frame 10 may be spaced apart from the carrier 11. The carrier 11 may be in contact with a wearer's body part. The body part may include such as an eye, finger, wrist, elbow, arm, chest, neck, ear, thigh, knee, leg, foot, or others. In the example of FIG. 1, the carrier 11 may be in contact with a wearer's eye 50. The wearer's eye may include a pupil 50a, an iris 50b, and sclera 50c, as indicated by dashed lines in FIG. 1. The carrier 11 may include a region 11a and a region 11b. The region 11b may surround the region 11a. The region 11*b* may enclose the region 11*a*. The region 11*a* may cover the pupil 50*a* when worn. The region 11*a* may be substantially aligned with the pupil 50*a*. The region 11*a* may cover a portion of the iris 50*b*. The region 11*b* may cover a portion of the iris 50*b*. The region 11*b* may cover a portion of the sclera 50*c*. There may be no clear boundary between the region 11*a* and the region 11*b*. The region 11*a* may be otherwise defined as a region substantially aligned with the pupil 50*a*. The region 11*b* may be free from overlapping with the pupil 50*a*. The carrier 11 may include a contact lens.

The frame 10 may include a transceiving module 10*t* which may be configured to transmit or receive a wave (e.g., a signal such as a radio frequency or microwave signal). The transceiving module 10*t* may be configured to receive or transmit an electromagnetic wave of a frequency lower than 300 GHz. The transceiving module 10*t* may include a transceiver 101 and a processor 102. The transceiver 101 may be configured to transmit or receive a wave. The processor 102 may be configured to process a wave received by the transceiver 101 or a wave to be transmitted by the transceiver 101.

The frame 10 may include a glass. The frame 10 may include a glass with zero diopter. The glass of the frame 10 may include a transparent panel configured to display a visual image. In some embodiments, the frame 10 may include a helmet, a face shield, a cap, a mask, hair accessories, or others.

The carrier 11 may include a transceiving module 11*t*. The transceiving module 11*t* may be disposed in the region 11*b*. The transceiving module 11*t* may be non-overlapping with the pupil 50*a*. The transceiving module 11*t* may be configured to transmit or receive a wave. The transceiving module 11*t* may be configured to transmit or receive a radio frequency or microwave signal. The transceiving module 11*t* may be configured to receive or transmit an electromagnetic wave of a frequency lower than 300 GHz. The transceiving module 11*t* may be powered by a wave. As such, the transceiving module may require no battery element.

Figure 2:
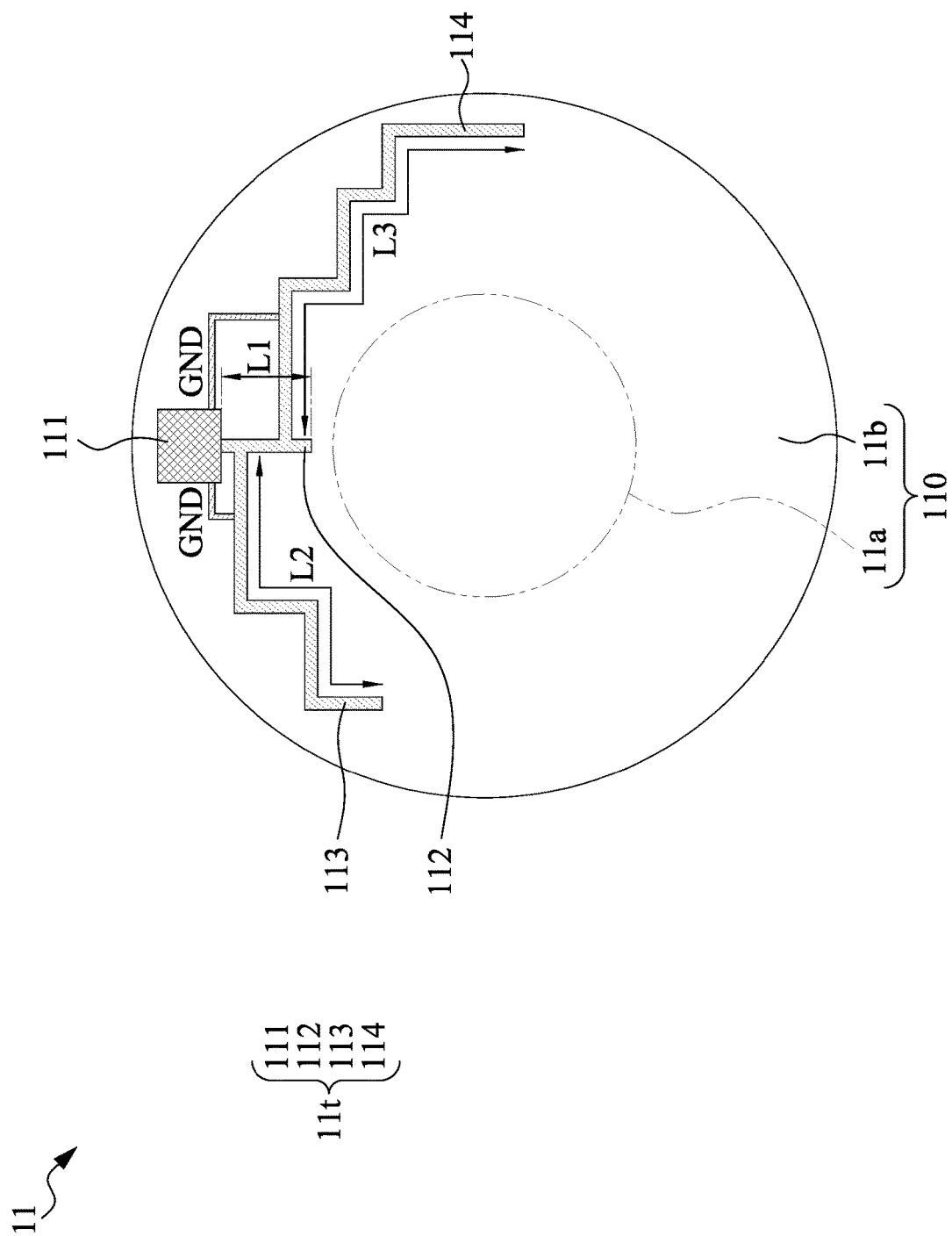
FIG. 2 is a top view of a body-part tracking device in accordance with some embodiments of the present disclosure.

FIG. 2 is a detailed top view of the body-part tracking device 11 (i.e., the carrier 11) in accordance with some embodiments of the present disclosure. The transceiving module 11*t* of the body-part tracking device 11 may include an electronic component 111, an antenna element 112, an antenna element 113, and an antenna element 114. The electronic component 111 may include an identity code. The electronic component 111 may include a frequency-shift keying (FSK) module to shift a frequency of the received wave. The antenna element 112 may be electrically connected to the electronic component 111. The electronic component 111 may transmit or receive a wave through the antenna element 112. The antenna element 113 may be electrically connected to the electronic component 111. The electronic component 111 may transmit or receive a wave through the antenna element 113. The antenna element 114 may be electrically connected to the electronic component 111. The electronic component 111 may transmit or receive a wave through the antenna element 114. The antenna element 113 may be ground to the electronic component 111. The antenna element 14 may be ground to the electronic component 111.

The antenna element 112 may have a length L1. The antenna element 113 may have a length L2. The antenna element 114 may have a length L3. The length L1 of the antenna element 112, the length L2 of the antenna element 113, and the length L3 of the antenna element 114 may be different. For example, the length L3 may exceed the length L2 and the length L1. The length L2 may exceed the length L1. The antenna elements 112, 113, and 114 may be configured to transmit or receive waves of different frequencies. For example, the antenna element 114 may be configured to transmit or receive a wave with a relatively low frequency for better impedance matching. The antenna element 112 may be configured to transmit or receive a wave with a relatively high frequency for better impedance matching. The shape of the antenna elements 112, 113, or 114 may be varied. For example, the antenna elements 112, 113, or 114 may be linear, curved, zigzagged, or other shapes.

As shown in FIG. 2, the transceiving module 11*t* may be disposed in the region 11*b* of the carrier. The electronic component 111 and the antenna element (e.g., the antenna elements 112, 113, and 114) may be disposed in the region 11*b* of the carrier that is free from overlapping the pupil 50*a* when worn. Since the transmitting module 11*t* is set away from at a region covering the wearer's pupil 50*a* (e.g., the region 11*a*), the visual field of the wearer may be unobscured by any electronic component or antenna elements of the body-part tracking device 11 when worn. The carrier 110 may have a surface configured to be in contact with a wearer when the body-part tracking device is worn by the wearer. The surface of the carrier 110 may cover a body part of the wearer. The electronic component 111 and the antenna element (e.g., the antenna elements 112, 113, and 114) may be covered by the surface of the carrier. As such, the wearer can wear the body-part tracking device 11 without discomfort.

Figure 3:
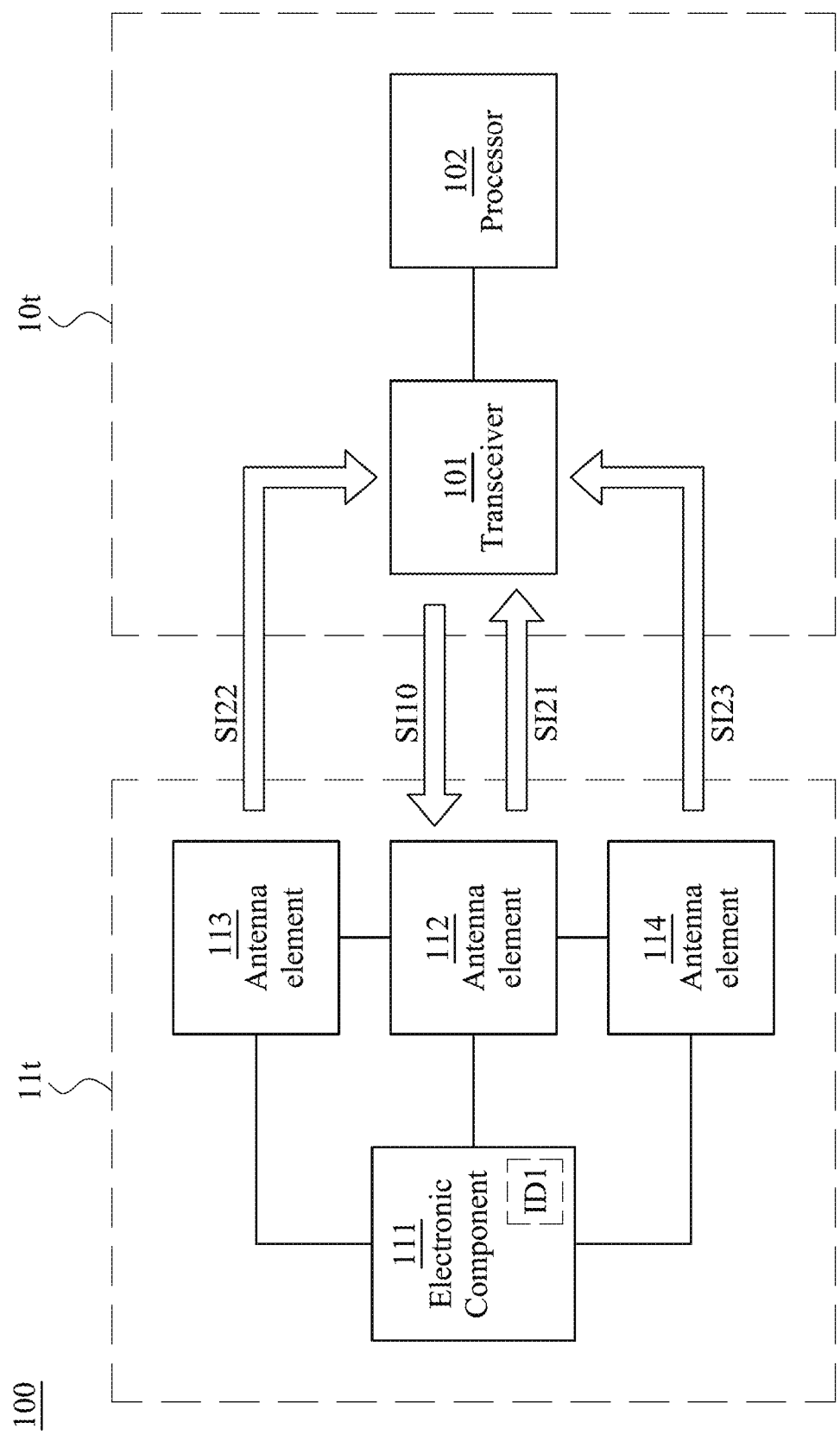
FIG. 3 is a block diagram of a body-part tracking device in accordance with some embodiments of the present disclosure.

FIG. 3 is a block diagram of the body-part tracking device 100 in accordance with some embodiments of the present disclosure. As shown in FIG. 3, the transceiver 101 of the transceiving module 10*t* may be configured to transmit a wave SI10 to the electronic component 111 through the antenna element 112. The antenna element 112 may be a feed point. The antenna element 112 may be configured to receive the wave SI10.

The electronic component 111 may be configured to store an identity code ID1. The identity code ID1 may include an RFID. The electronic component 111 may be configured to, in response to the wave SI10, transmit a wave SI21 to the transceiver 101 through the antenna element 112. The wave SI21 may include the identity code ID1. The electronic component 111 may be configured to be powered by the wave SI10. In some embodiments, the electronic component 111 may be configured to be powered by a wave other than the wave SI10. The electronic component 111 may be configured to shift the frequency of the wave SI10 by the FSK module to generate the wave SI21 or shift the phase of the wave SI10 by a phase modulation (PM) module to generate the wave SI21.

Furthermore, the electronic component 111 may be configured to, in response to the wave SI10, transmit a wave SI22 to the transceiver 101 through the antenna element 113. The wave SI22 may include the identity code ID1. The wave SI22 may have a frequency different from that of the wave SI21. The electronic component 11 may be configured to shift the frequency of the wave SI10 by the FSK module and generate the wave SI22. The electronic component 11 may be configured to, in response to the wave SI10, transmit a wave SI23 to the transceiver 101 through the antenna element 114. The wave SI23 may include the identity code ID1. The wave SI23 may have a frequency different from that of the wave SI21. The wave SI23 may have a frequency different from that of the wave SI22. The electronic component 11 may be configured to shift the frequency of the wave SI10 by the FSK module and generate the wave SI22. As such, the waves SI21, SI22, and SI23 may have different frequencies. In some embodiments, the electronic component 111 may generate waves of different phases by PM module to be waves SI22 and SI23. As such, the waves SI21, SI22, and SI23 may be of different phases. In some embodiments, the wave SI21, the wave SI22, and the wave SI23 may substantially have the same frequency and different phases.

The transceiving module 10t may be configured to transmit the wave SI10 to the transceiving module 11t before receiving the wave SI21. When the body-part tracking device 100 is worn, the processor 102 of the body-part tracking device 100 may be configured to determine a movement or a location of a body part of a wearer based on the wave SI21. The wave SI21 may correspond to an information of a viewing focus of a wearer's eye(s) (e.g., the wearer's pupil 50a). Furthermore, the movement of a body part (e.g., the eye 50) can be tracked based on the wave SI10 and the wave SI21. For example, the body-part tracking device 100 (e.g., the processor 102) may calculate the viewing focus or position of wearer's pupil 50a by determining differences in amplitude, phase, and or frequency between the wave SI10 and the wave SI21. For example, the transceiving module 10t may be configured to detect the phase of the wave SI21 in a first time slot and calculate a first phase difference between the wave SI10 and SI21, e.g., the phase of the wave SI10 may lead the phase of the wave SI21. The transceiving module 10t may be configured to determine a first relative distance between the transceiving module 10t and the transceiving module 11t in the first time slot. Similarly, the transceiving module 10t may be configured to detect the phase of the wave SI21 in a second time slot and calculate a second phase difference between the wave SI10 and SI21. The transceiving module 10t may be configured to determine a second relative distance between the transceiving module 10t and the transceiving module 11t in the second time slot. As such, the body-part tracking device 100 may be configured to determine a movement of the transceiving module 11t or, in other words, the wearer's eye, based on the first relative distance and the second relative distance. For example, when the wearer closes the eye or wink, the amplitude of the wave SI21 may fall below that of the wave SI10. For example, the waves SI10, SI21, SI22, and SI23 may have different frequencies to prevent an interference among the waves SI10, SI21, SI22, and SI23. Furthermore, the transceiving module 10t may be configured to distinguish a received wave (e.g., the waves SI21, SI22, SI23) based on their frequencies and then determine which antenna element transmits the aforesaid wave. The transceiving module 10t may be configured to receive the wave SI21 from the transceiving module 11t and, based on the wave SI21, determine at least one of: a location of the body part (e.g., the wearer' eye 50), a movement of the body part (e.g., the wearer' eye 50), or a viewing focus of the body part (e.g., the wearer' eye 50). Once the viewing focus of the wearer' eye 50 is determined, the body-part tracking device 100 (e.g., the glass of the frame 10) may be configured to display a visual image based on the viewing focus, such that the wearer can clearly see the visual image. In some embodiments, once the viewing focus of the wearer' eye 50 is determined, the body-part tracking device 100 may providing the information of the viewing focus to an external system (e.g., a game console), such that the external system may be configured to generate a signal or message in response to the viewing focus.

Furthermore, to improve accuracy, the electronic component 111 may transmit the wave SI22 through the antenna element 113 and/or the wave SI23 through the antenna element 114. The waves SI10, SI21, SI22, and SI23 may include radio-frequency (RF) or microwave signals. The processor 102 may be configured to distinguish the waves SI21, SI22, and SI23. The processor 102 may respectively determine differences in amplitude, phase, and/or frequency among the wave SI10 and the waves SI21, SI22, and SI23. The processor 102 may use triangulation to determine the location of a body part (e.g., the eye 50 or the pupil 50a) and then determine the movement of a body part (e.g., the eye 50 or the pupil 50a) during a period of time. In other words, the transceiving module 10t may be configured to receive the waves SI21, SI22, and SI23 from the transceiving module 11t and determine, based on the waves SI21, SI22, and SI23 at least one of: a location of the body part (e.g., the wearer' eye 50), a movement of the body part (e.g., the wearer' eye 50), or a viewing focus of the body part (e.g., the wearer' eye 50).

In some comparative embodiments, the conventional product emits infrared (IR) light to the wearer's eye and receives reflected IR light therefrom to determine movement or location of the eye. IR light is harmful under long-term use. In the present disclosure, the body-part tracking device 100 comprises the transceiving module 10t of the frame 10 that transmits a RF or microwave signal. Since the RF or microwave signal is not reflected by the body part, the body-part tracking device 100 has the transceiving module 11t that receives the RF or microwave signal (e.g., the wave SI10) and, in response thereto, transmits one or more RF or microwave signals (e.g., the wave SI21, the wave SI22, and/or the wave SI23) through one or more antenna elements (e.g. the antenna element 112, the antenna element 113, and/or the antenna element 114). The RF or microwave signal has a frequency lower than 300 GHz, which is less harmful to the wearer. As such, the wearer can use the body-part tracking device 100 longer without concern for damage.

Figure 4:
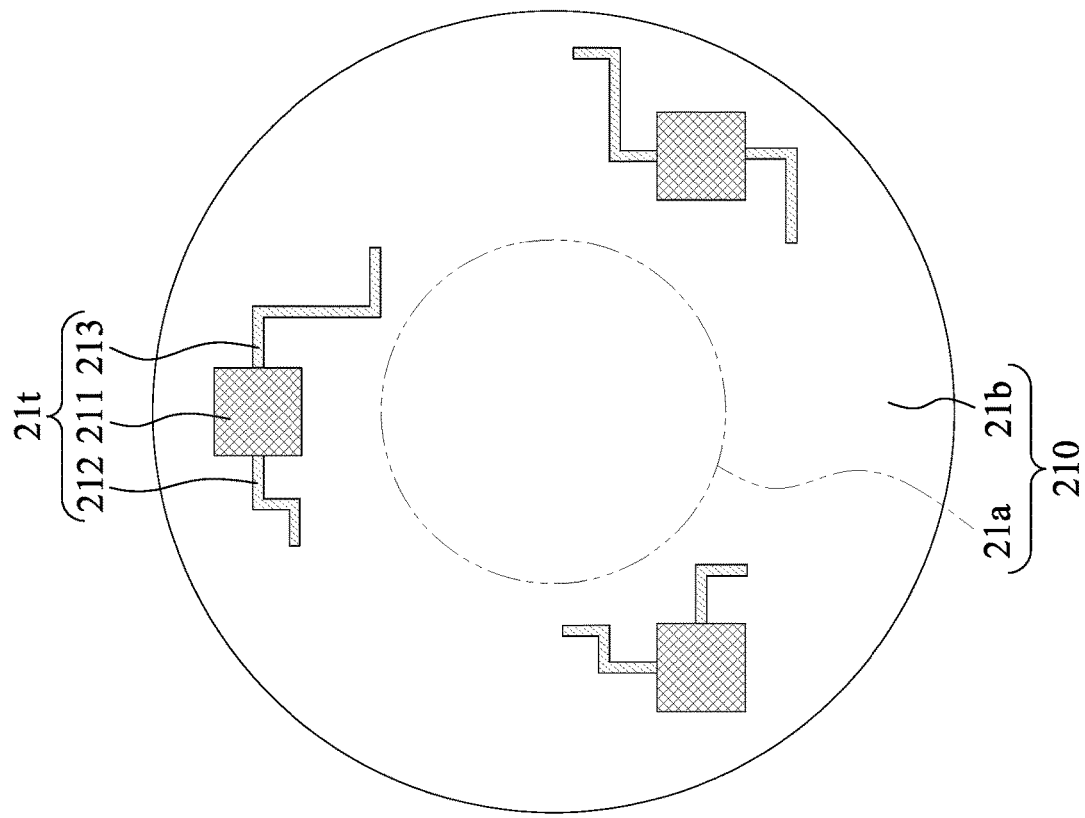
FIG. 4 is a detailed top view of a body-part tracking device in accordance with some embodiments of the present disclosure.

FIG. 4 is a detailed top view of a body-part tracking device 21 in accordance with some embodiments of the present disclosure. The body-part tracking device 21 of FIG. 4 is similar to the body-part tracking device 11 of FIG. 2, with differences therebetween as follows.

The body-part tracking device 21 may include a region 21a and a portion 21b. The region 21b may surround the portion 21a. The region 21a may be substantially aligned with the pupil 50a when worn. The body-part tracking device 21 includes a plurality of transceiving modules 21t disposed in the region 21b. Each of the transceiving modules 21t may be spaced apart. Each of the transceiving modules 21t may include an electronic component 211, an antenna element 212, and an antenna element 213. The antenna element 212 may be electrically connected to the electronic component 211. The antenna element 213 may be electrically connected to the electronic component 211. The electronic component 211 may receive a wave through the antenna element 213. The electronic component 211 may transmit a wave through the antenna element 212. Each of the electronic components may be configured to store a unique identity code. The transceiving module 10t of the frame 10 may be configured to transmit a wave (e.g., the wave SI10 in FIG. 3) to the plurality of transceiving modules 21t through the antenna element 213. The electronic component 211 of each of the transceiving modules 21t may be configured to, in response to the wave SI10, transmit a wave including its own identity code through the antenna element 212. The processor 102 may be configured to distinguish the waves based on the identity code. The processor 102 may respectively determine differences in amplitude, phase, and or frequency between the wave SI10 and the waves SI21, SI22, and SI23. The processor 102 may use triangulation to determine the location of a body part (e.g., the eye 50 or the pupil 50a) and then determine the movement of a body part (e.g., the eye 50 or the pupil 50a) during a period of time.

Persons of ordinary skill in the art will appreciate that the numbers of the transceiving module can be varied, for example equaling or exceeding two. The accuracy of determining the movement or the position of the pupil may increase with the number of the transceiving modules.

Figure 5:
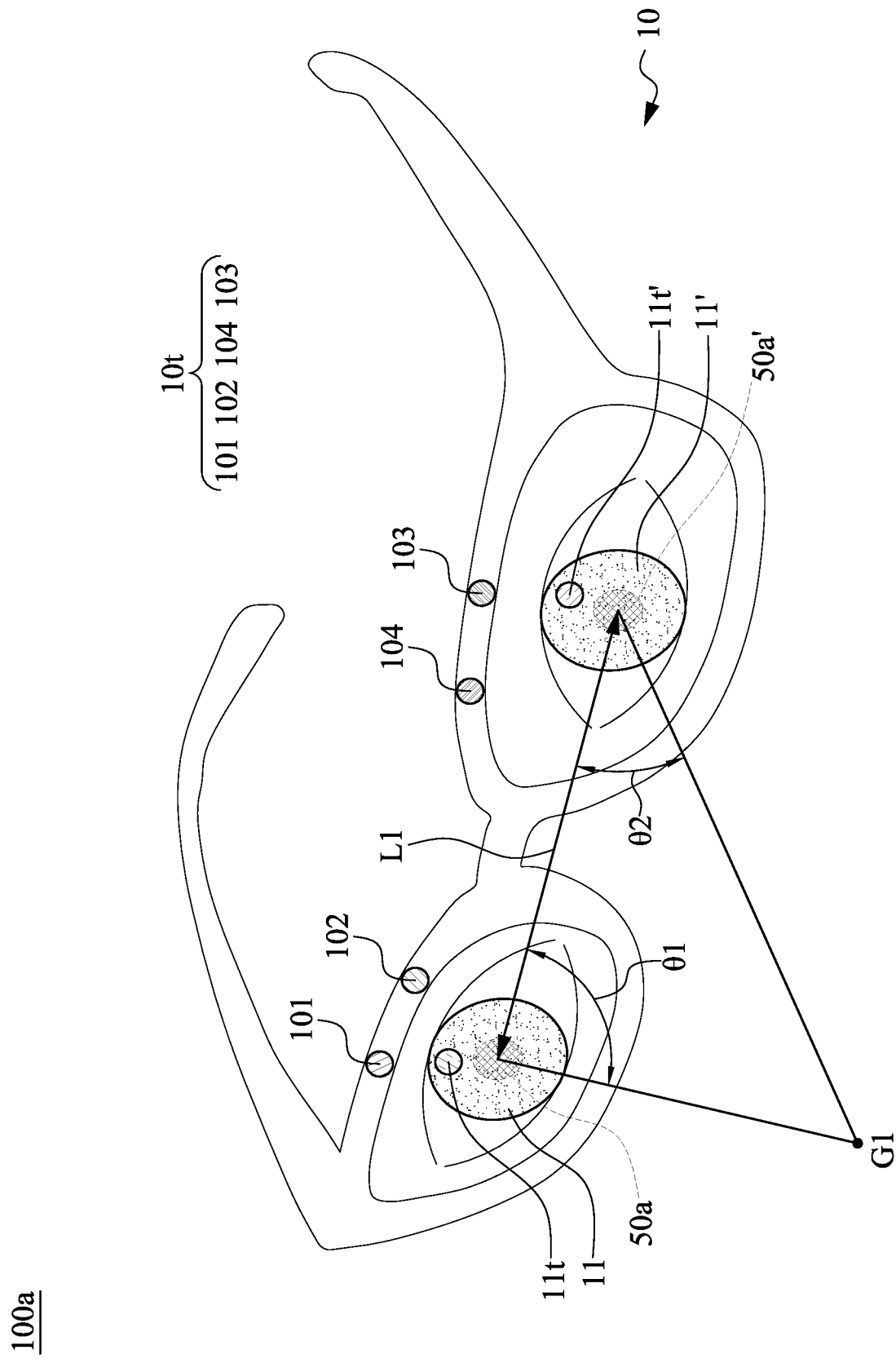
FIG. 5 is a diagram of a body-part tracking device when worn in accordance with some embodiments of the present disclosure.

FIG. 5 is a diagram of a body-part tracking device 100a when worn in accordance with some embodiments of the present disclosure. The body-part tracking device 100a of FIG. 5 is similar to the body-part tracking device 100 of FIG. 1, with differences therebetween as follows.

The optical tracking device 100a may include a carrier 11'. The carrier 11' may be similar to the carrier 11 of the body-part tracking device 100. The carrier 11' may cover a wearer's 'pupil 50a'. The carrier 11' may include a transceiving module 11t' which is similar to the transceiving module 11t of the carrier 11. The differences therebetween may include different identity codes for their electronic components (e.g., the electronic components 111). The transceiving module 11t' may be disposed in a region of the carrier 11' that fails to overlap with the pupil 50a'. The transceiving module 10t may be configured to receive a wave from the transceiving module 11t'.

The frame 10 of the body-part tracking device 100a may further include a transceiver 103 and a component 104. The frame may include eyeglasses. The eyeglasses may include a transparent panel configured to display a visual image. The transceiver 101 and the processor may be disposed on one side of the eyeglasses, while the transceiver 103 and the component 104 may be disposed on the other. The transceiver 101 of the transceiving module 10t may be located closer to the carrier 11 than the carrier 11'. The transceiver 103 of the transceiving module 10t may be located closer to the carrier 11' than the carrier 11.

Figure 6:
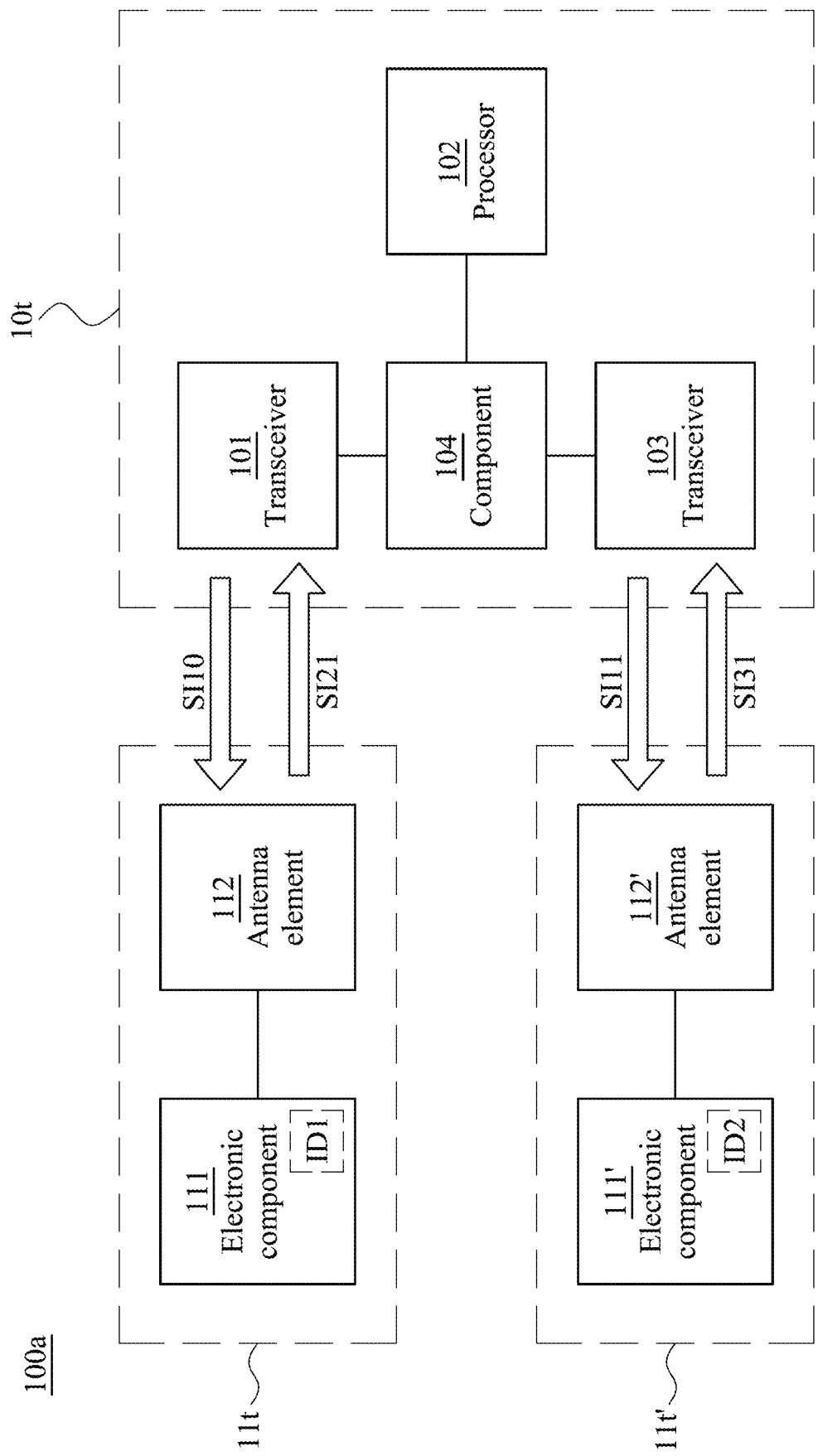
FIG. 6 is a block diagram of a body-part tracking device in accordance with some embodiments of the present disclosure.

FIG. 6 is a block diagram of the body-part tracking device 100a in accordance with some embodiments of the present disclosure. As shown in FIG. 6, the transceiver 101 of the transceiving module 10t may be configured to transmit a wave SI10 to the electronic component 111 through the antenna element 112. The transceiving module 11' may include an electronic component 111' and an antenna element 112'. The transceiver 103 of the transceiving module 10t may be configured to transmit a wave SI11 to the electronic component 111' through the antenna element 112'. The antenna element 112' may be a feed point. The antenna element 112' may be configured to receive the wave SI11.

The electronic component 111 may be configured to store the identity code ID1. The identity code ID1 may include an RFID. The electronic component 111 may be configured to, in response to the wave SI10, transmit the wave SI21 to the transceiver 101 through the antenna element 112. The wave SI21 may include the identity code ID1. The electronic component 111 may be configured to be powered by the wave SI10.

The electronic component 111' may be configured to store the identity code ID2. The identity code ID2 may include an RFID. The electronic component 111' may be configured to, in response to the wave SI11, transmit a wave SI31 to the transceiver 103 through the antenna element 112'. The wave SI31 may include the identity code ID2. The electronic component 111' may be configured to be powered by the wave SI11. The electronic component 111' may be configured to shift the frequency of the wave SI11 by a FSK module to generate the wave SI31 or shift the phase of the wave SI11 by a PM module to generate the wave SI31. In some embodiments, the transceiving module 10t may be configured to receive the wave SI31 from the transceiving module 11t', and determine, based on the wave SI31, at least one of: a location of the body part (e.g., the wearer's pupil 50a'), a movement of the body part (e.g., the wearer's pupil 50a'), or a viewing focus of the body part (e.g., the wearer's pupil 50a').

The wave SI21 and the wave SI31 may have different frequencies or phases. The wave SI21 and the wave SI31 may be transmitted to the component 104. The component 104 may configured to distinguish between the wave SI21 and the wave SI31. The component 104 may include a tuner. Subsequently, the processor 102 of the transceiving module 10t may be configured to, based on the wave SI21 and the third wave SI31, determine a binocular viewing focus G1 of the wearer's eyes (e.g., the binocular viewing focus of the pupils 50a and 50a') as shown in FIG. 5. Once the binocular viewing focus G1 is determined, the body-part tracking device 100a (e.g., the transparent panel of the eyeglasses of the frame 10) may be configured to display a visual image based on the location of the binocular viewing focus G1, such that the wearer can clearly see the visual image. In some embodiments, once the binocular viewing focus G1 is determined, the body-part tracking device 100a may providing the information of the viewing focus to an external system (e.g., a game console), such that the external system may be configured to generate a signal or message in response to the binocular viewing focus G1.

Referring again to FIG. 5, an imaginary straight line L1 between the pupil 50a and the pupil 50a' is illustrated. An angle θ1 may be formed between the viewing direction of the pupil 50a and the line L1. An angle θ2 may be formed between the viewing direction of the pupil 50a' and the line L1. The determination of the binocular viewing focus G1 of the wearer's eyes (e.g., the pupils 50a and 50a') may include a trigonometric calculation based on the distance between the pupils 50a and 50a' of the wearer's eyes (i.e., the length of the line L1), and angles θ1 and θ2 formed between the viewing direction of the wearer's pupils and the line L1 between the wearer's pupils 50a and 50a'.

In some embodiments, the transceiving module 10t may be configured to receive the wave SI21 from the transceiving module 11t and the wave SI31 from the transceiving module 11t', and determine, based on the waves SI21 and SI31, at least one of the following: a location of the body part (e.g., the wearer's eye 50), a movement of the body part (e.g., the wearer's eye 50), or a viewing focus of the body part (e.g., the wearer's eye 50).

Figure 7A:
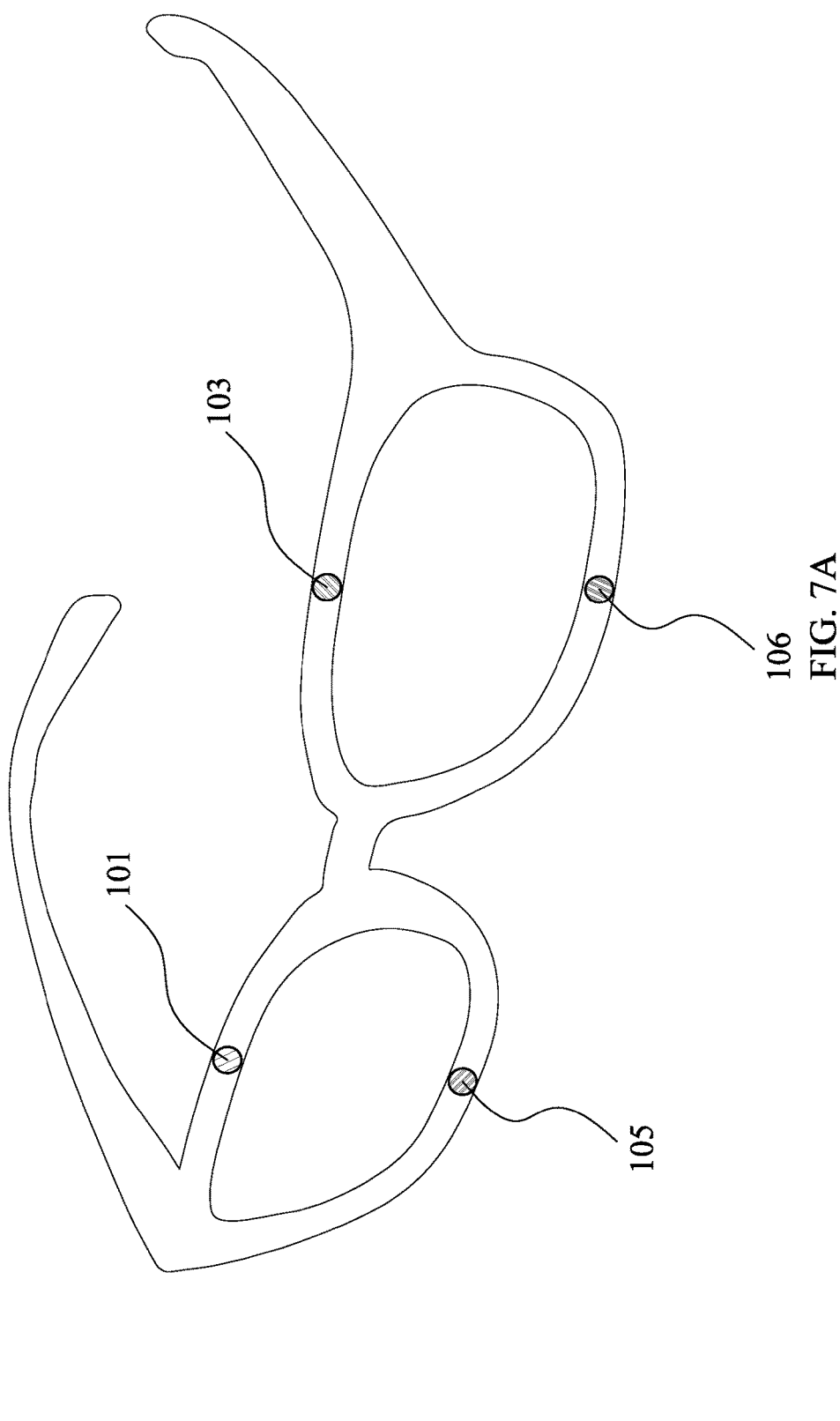
FIG. 7A is a diagram of a body-part tracking device in accordance with some embodiments of the present disclosure.

FIG. 7A is a diagram of a body-part tracking device 20a in accordance with some embodiments of the present disclosure. The body-part tracking device 20a of FIG. 7A is similar to the body-part tracking device 10 of FIG. 5, with differences therebetween as follows.

The body-part tracking device 20a may further include a transceiver 105 and a transceiver 106. The transceiver 105 may be disposed at the left-lower side of the body-part tracking device 20a and may be configured to transmit or receive a wave including a RF or microwave signal. The transceiver 106 may be disposed at the right-lower side of the body-part tracking device 20a and may be configured to transmit or receive a wave including a RF or microwave signal.

Figure 7B:
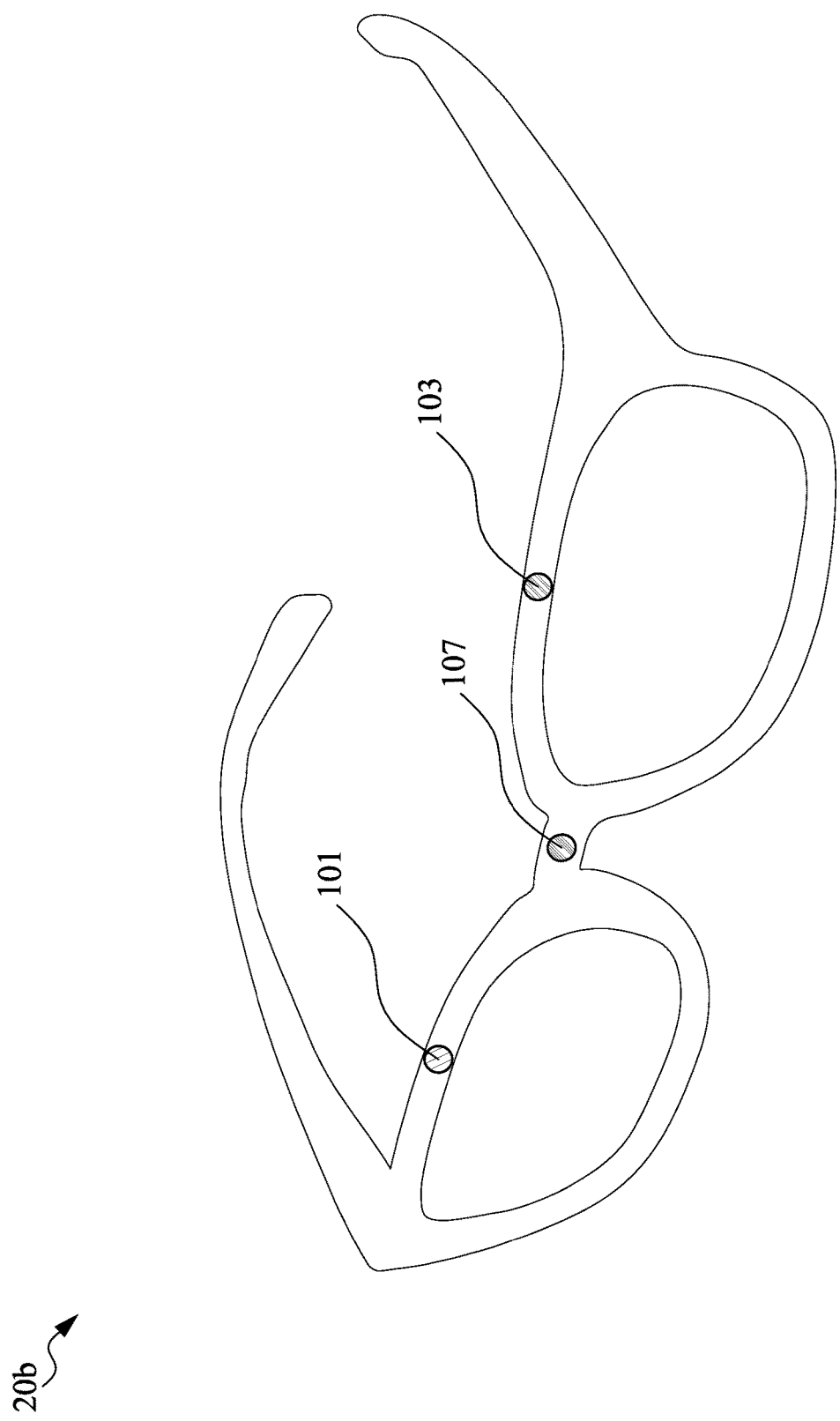
FIG. 7B is a diagram of a body-part tracking device in accordance with some embodiments of the present disclosure.

FIG. 7B is a diagram of a body-part tracking device 20b in accordance with some embodiments of the present disclosure. The body-part tracking device 20a of FIG. 7B is similar to the body-part tracking device 10 of FIG. 5, with differences therebetween as follows.

The body-part tracking device 20*b* may further include a transceiver 107. The transceiver 107 may be disposed at the middle region of the body-part tracking device 20*b* and may be configured to transmit or receive a wave including a RF or microwave signal.

Figure 8:
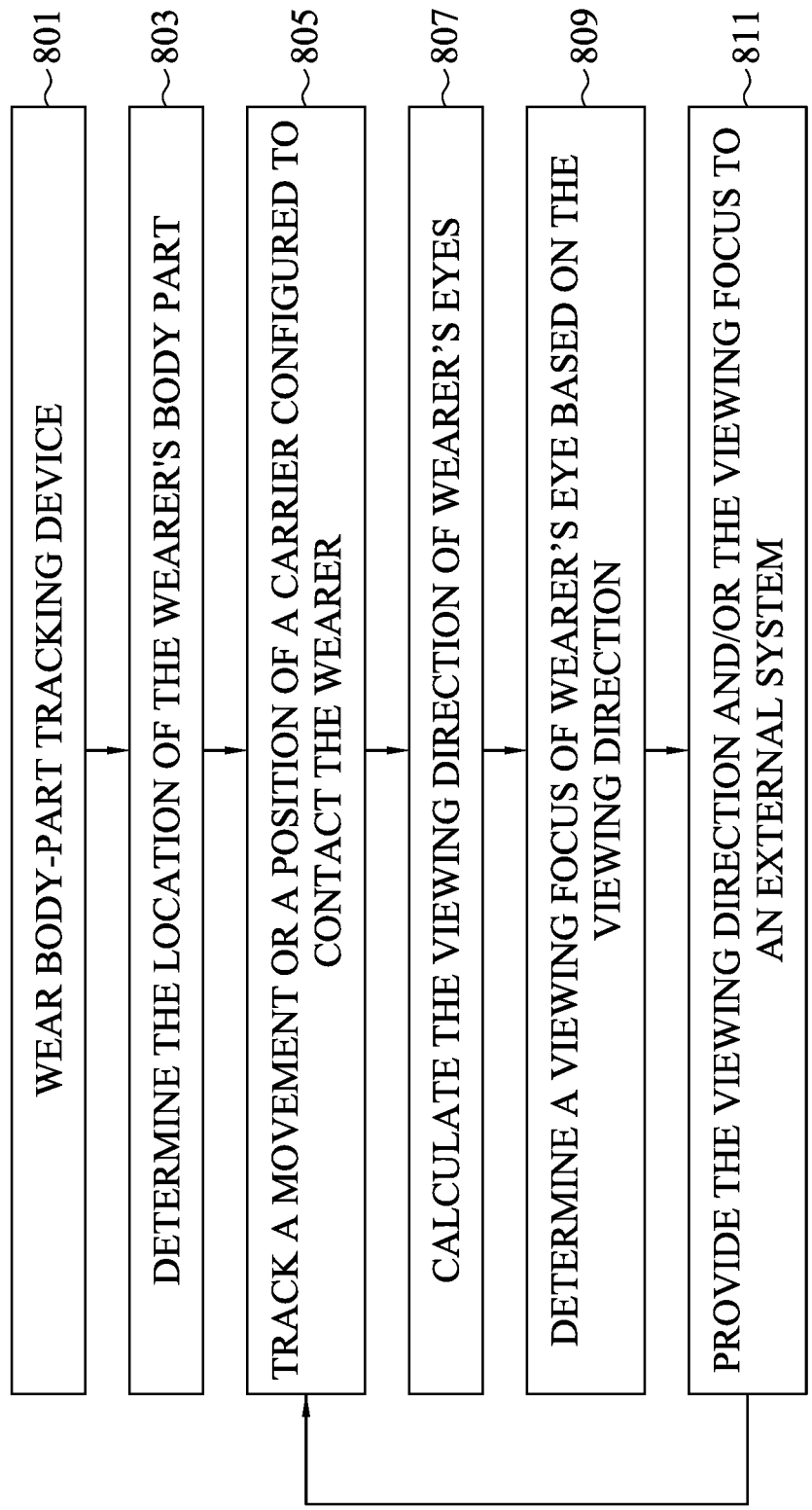
FIG. 8 is a flowchart of a body-part tracking method in accordance with some embodiments of the present disclosure.

FIG. 8 is a flowchart of a body-part tracking method 8 in accordance with some embodiments of the present disclosure. The body-part tracking method 8 may include Steps 801, 803, 805, 807, 809, and 811.

In Step 801, a wearer may wear a body-part tracking device (e.g., the body-part tracking device 100 or the body-part tracking device 100*a*). The body-part tracking device may be configured to be in contact with wearer's body part (e.g., wearer's eye and/or face).

In Step 803, the body-part tracking device may be configured to determine the location of the wearer's body part (e.g., wearer's eye and/or face). The location of the body part of each wearer may be different. For example, the locations of eyes of each wearer may be different depending on the size of eyes or the distance therebetween. The body-part tracking device may be configured to determine the location of each wearer when firstly worn. When the body-part tracking device is worn by a second wearer after the first wearer, the body-part tracking device may be configured to calibrate the distance between the carrier (e.g., the carrier 11) and the frame (e.g., the frame 10) of the body-part tracking device based on the location of the second wearer's body part.

In Step 805, the body-part tracking device may be configured to track a movement or a position of carrier configured to contact the wearer's eye. Furthermore, Step 805 may include transmitting a first RF wave and transmitting, in response to the first RF wave, a second RF wave having an identity code. The body-part tracking device may be configured to track the movement or the position of the carrier based on the first RF wave and the second RF wave.

In addition, Step 805 may include transmitting a plurality of RF first waves and transmitting, in response to the first RF waves, a plurality of second RF waves each having an identity code. The second RF waves are each of different frequencies, amplitudes, and/or phases.

In Step 807, the body-part tracking device may be configured to calculate the viewing direction of wearer's eyes. The body-part tracking device may include a processor and a memory storing one or more programming codes. The processor may implement the programming codes to execute the calculation of the viewing direction of wearer's eyes.

In Step 809, the body-part tracking device may be configured to determine a viewing focus of wearer's eye based on the viewing direction. The determination of the viewing focus of wearer's eye may include a trigonometric calculation based on the distance between wearer's pupils, and angles (e.g., the angles θ1 and θ2 in FIG. 5) formed between the viewing direction of the wearer's pupils and the line L1 between the wearer's pupils.

Step 809 may further include determining, based on the RF first wave or the RF second wave, at least one of: a location, a movement, or a viewing focus of the wearer's eye.

In Step 811, the body-part tracking device may be configured to provide the viewing direction and/or the viewing focus to an external system through wire or wirelessly.

Steps 805, 807, 809, and 811 may be repeated to continue tracking the viewing focus, the movement, and the position of the wearer's pupil. Persons of ordinary skill in the art would appreciate that the sequence of the body-part tracking method can be varied in alternative embodiments.

Spatially relative terms, such as "beneath," "below," "lower," "above," "upper," "left," "right" and the like, may be used herein for ease of description to describe one element or feature's relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately", "substantially", "substantial" and "about" are used to describe and account for small variations. When used in conduction with an event or circumstance, the terms can refer to instances in which the event or circumstance occurs precisely as well as instances in which the event or circumstance occurs to a close approximation. As used herein with respect to a given value or range, the term "about" generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. The term "substantially coplanar" can refer to two surfaces within micrometers (μm) of lying along the same plane, such as within 10 μm, within 5 μm, within 1 μm, or within 0.5 μm of lying along the same plane. When referring to numerical values or characteristics as "substantially" the same, the term can refer to the values lying within ±10%, ±5%, ±1%, or ±0.5% of an average of the values.

The foregoing outlines features of several embodiments and detailed aspects of the present disclosure. The embodiments described in the present disclosure may be readily used as a basis for designing or modifying other processes and structures for carrying out the same or similar purposes and/or achieving the same or similar advantages of the embodiments introduced herein. Such equivalent constructions do not depart from the spirit and scope of the present disclosure, and various changes, substitutions, and alterations may be made without departing from the spirit and scope of the present disclosure.

What is claimed is:

1. A body-part tracking device, comprising:
   a first electronic component configured to receive a first radio-frequency wave;
   a first antenna element electrically connected to the first electronic component, and
   a second antenna element electrically connected to the first electronic component,
   wherein the first electronic component is configured to, in response to the first radio-frequency wave, transmit a second radio-frequency wave through the first antenna element,
   wherein the first electronic component is configured to, in response to the first radio-frequency wave, transmit a third radio-frequency wave through the second antenna element,
   wherein the second radio-frequency wave has a first frequency, and the third radio-frequency wave has a second frequency different from the first frequency, wherein a viewing focus or position of a wearer's pupil is calculated by determining differences in amplitude, phase, and or frequency between the first radio-frequency wave and the second radio-frequency.

2. The body-part tracking device of claim 1, further comprising a third antenna element, wherein the first electronic component is configured to shift a third frequency of the first radio-frequency wave received by the third antenna element to generate the second radio frequency wave having the first frequency, and third frequency is different from the first frequency, and wherein the first electronic component comprises a frequency-shift keying (FSK) module configured to shift the third frequency of the first radio-frequency wave to generate the third radio-frequency wave having the second frequency, and the second frequency is different from the third frequency.

3. The body-part tracking device of claim 1, further comprising a third antenna element, wherein the first electronic component comprises a phase modulation (PM) module configured to shift a first phase of the first radio-frequency wave received by the third antenna element to generate the second radio-frequency wave having a second phase, and the second phase is different from the first phase.

4. The body-part tracking device of claim 1, wherein the first antenna element and the second antenna element each has a zigzagged portion.

5. The body-part tracking device of claim 4, further comprising a carrier supporting the first antenna element and the second antenna element, wherein a first zigzagged portion of the first antenna element substantially extends along a perimeter of a first region of the carrier, and the first region covers and is substantially aligned with the wearer's pupil.

6. The body-part tracking device of claim 5, wherein the first zigzagged portion of the first antenna element has a plurality of first vertical sections and a plurality of first horizontal sections.

7. The body-part tracking device of claim 6, wherein a second zigzagged portion of the second antenna element has a plurality of second vertical sections and a plurality of second horizontal sections, wherein the numbers of the second vertical sections and the second horizontal sections are greater than the numbers of the first vertical sections and the first horizontal sections, respectively.

8. The body-part tracking device of claim 7, wherein the first zigzagged portion and the second zigzagged portion collectively surrounds substantially a half of the perimeter of the region.

9. The body-part tracking device of claim 1, wherein the first antenna and the second antenna are ground to the first electronic component.

10. A body-part tracking device, comprising:
a first carrier configured to contact a first body part of a wearer when worn, the first carrier including a first transceiving module; and
a frame spaced apart from the first carrier, the frame including a second transceiving module,
wherein the second transceiving module is configured to receive a first radio-frequency wave and a second radio-frequency wave radiated from the first transceiving module and to determine, based thereon, at least one of: a first location of the first body part, a first movement of the first body part, or a viewing focus of the first body part,
wherein the body-part tracking device is configured to determine a location of each wearer when firstly worn, wherein the second transceiving module is configured to detect a phase of the second radio-frequency wave in a first time slot and calculate a first phase difference between the first radio-frequency wave and the second radio-frequency wave.

11. The body-part tracking device of claim 10, wherein the first transceiving module is further configured to radiated from a third radio-frequency wave having a third frequency different from the first frequency and the second frequency, wherein the first transceiving module comprises a first antenna element, a second antenna element, and a third antenna element that are spaced apart from each other, and wherein the first antenna element, the second antenna element, and the third antenna element are configured to transmit the first radio-frequency wave, the second radio-frequency wave, and the third radio-frequency wave, respectively.

12. The body-part tracking device of claim 10, further comprising: a second carrier, in contact with a second body part, and spaced apart from the first carrier, wherein the second carrier comprises a third transceiving module configured to transmit a third radio-frequency wave having a frequency different from the first radio-frequency wave, wherein the second transceiving module is configured to receive the third radio-frequency wave to determine a second location of the second body part and a second movement of the second body part, wherein the frame comprises a processor configured to calculate a binocular viewing focus of the first body part and the second body part at least based on the first radio-frequency wave and the third radio-frequency wave.

13. The body-part tracking device of claim 10, wherein the second transceiving module configured to detect the phase of the second radio-frequency wave in a second time slot and calculate a second phase difference between the first radio-frequency wave and the second radio-frequency wave.

14. The body-part tracking device of claim 13, wherein the second transceiving module is configured to determine a first relative distance in the first time slot and a second relative distance in the second time slot between the second transceiving module and the first transceiving module.

15. The body-part tracking device of claim 10, wherein, when the body-part tracking device is worn by a second wearer after a first wearer, the body-part tracking device is configured to calibrate a distance between the carrier and the frame of the body-part tracking device.

16. The body-part tracking device of claim 15, wherein the calibration is performed in response to the different locations of eyes of each wearer.

17. The body-part tracking device of claim 10, wherein the first transceiving module comprises a plurality of transmitting antenna elements, which are electrically disconnected from each other.

18. The body-part tracking device of claim 17, wherein the transmitting antenna elements each has a zigzagged portion.

19. The body-part tracking device of claim 17, wherein the first transceiving module comprises a plurality of receiving antenna elements, which are electrically disconnected from each other.

* * * * *